United States Patent
Inoue et al.

(10) Patent No.: US 10,358,961 B2
(45) Date of Patent: Jul. 23, 2019

(54) EXHAUST APPARATUS FOR DIESEL ENGINE

(71) Applicant: KUBOTA Corporation, Osaka-shi, Osaka (JP)

(72) Inventors: Katsushi Inoue, Sakai (JP); Mikio Ishida, Sakai (JP); Ryota Sakai, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 33 days.

(21) Appl. No.: 15/371,911

(22) Filed: Dec. 7, 2016

(65) Prior Publication Data

US 2017/0183999 A1   Jun. 29, 2017

(30) Foreign Application Priority Data

Dec. 25, 2015 (JP) ................ 2015-253233

(51) Int. Cl.
*F01N 3/20* (2006.01)
*F01N 3/025* (2006.01)
(Continued)

(52) U.S. Cl.
CPC ....... *F01N 3/2033* (2013.01); *B01D 46/0027* (2013.01); *B01D 46/0063* (2013.01);
(Continued)

(58) Field of Classification Search
CPC ........... F01N 2560/021; F01N 2610/02; F01N 3/208; F01N 2570/14; B01D 2251/2062; F02D 2041/1433; F23N 1/022
See application file for complete search history.

(56) References Cited

U.S. PATENT DOCUMENTS 5,388,404 A * 2/1995 Tsumura ............ F01N 3/2013
                                            219/202
8,011,177 B2 * 9/2011 Cheng ................. F01N 3/0222
                                            60/274
(Continued)

FOREIGN PATENT DOCUMENTS

GB    2340054 A    2/2000
JP    H05222925 A  8/1993
(Continued)

OTHER PUBLICATIONS

Extended European Search Report dated Apr. 18, 2017 in EP Application No. 16199289.6.

*Primary Examiner* — Audrey K Bradley
*Assistant Examiner* — Anthony Ayala Delgado
(74) *Attorney, Agent, or Firm* — Panitch Schwarze Belisario & Nadel LLP

(57) ABSTRACT

An exhaust apparatus for a diesel engine rapidly burns an unburned deposit in an upstream exhaust catalyst with heat of a heater. The exhaust apparatus includes a downstream exhaust cleaner, an upstream exhaust catalyst provided in an exhaust passage, upstream of the downstream exhaust cleaner, a heater disposed at an exhaust inlet of the upstream exhaust catalyst, and an engine starter apparatus. A control unit controls the power supply to the heater and an engine start process is performed by the engine starter apparatus. A start command unit is connected to the control unit. When the engine has been stopped and then the start command unit gives the control unit a start command, the control unit powers the heater without performing an engine start process, thereby keeping the engine stopped for a predetermined period of time after the start command has been given, and subsequently performing the engine start process.

14 Claims, 2 Drawing Sheets

(51) Int. Cl.
  *F01N 13/00* (2010.01)
  *B01D 46/00* (2006.01)
  *B01D 53/94* (2006.01)
  *F01N 3/035* (2006.01)
  *F01N 9/00* (2006.01)
  *F01N 11/00* (2006.01)
  *F02N 11/08* (2006.01)
  *F02D 41/02* (2006.01)
  *F01N 3/021* (2006.01)
  *F02N 11/10* (2006.01)

(52) U.S. Cl.
  CPC ....... *B01D 53/944* (2013.01); *B01D 53/9431* (2013.01); *B01D 53/9495* (2013.01); *F01N 3/021* (2013.01); *F01N 3/0253* (2013.01); *F01N 3/035* (2013.01); *F01N 3/208* (2013.01); *F01N 3/2013* (2013.01); *F01N 3/2066* (2013.01); *F01N 9/00* (2013.01); *F01N 9/002* (2013.01); *F01N 11/002* (2013.01); *F01N 13/009* (2014.06); *F01N 13/0097* (2014.06); *F02D 41/0235* (2013.01); *F02N 11/0803* (2013.01); *F02N 11/101* (2013.01); *B01D 2279/30* (2013.01); *F01N 2240/16* (2013.01); *F01N 2610/03* (2013.01); *F01N 2610/146* (2013.01); *F01N 2900/08* (2013.01); *F01N 2900/1602* (2013.01); *F01N 2900/1606* (2013.01); *F02N 2300/2011* (2013.01); *Y02T 10/24* (2013.01); *Y02T 10/26* (2013.01); *Y02T 10/47* (2013.01)

(56) References Cited

U.S. PATENT DOCUMENTS

| | | | | |
|---|---|---|---|---|
| 8,615,988 | B2* | 12/2013 | Gonze | F01N 3/0222 60/274 |
| 9,784,157 | B2* | 10/2017 | Norton | F01N 3/208 |
| 2008/0223019 | A1 | 9/2008 | Gonze et al. | |
| 2008/0282673 | A1 | 11/2008 | Gonze et al. | |
| 2008/0282674 | A1* | 11/2008 | Gonze | B60K 6/48 60/285 |
| 2010/0212981 | A1 | 8/2010 | Roos et al. | |
| 2014/0033923 | A1* | 2/2014 | Yabe | B01D 46/0063 95/278 |
| 2015/0086426 | A1* | 3/2015 | DeGeorge | F01N 11/007 422/108 |
| 2015/0337703 | A1* | 11/2015 | Zhang | F01N 3/2013 60/274 |
| 2016/0084137 | A1* | 3/2016 | Cunningham | F01N 11/002 73/114.76 |

FOREIGN PATENT DOCUMENTS

| | | | |
|---|---|---|---|
| JP | 2013068184 A | 4/2013 | |
| WO | 9212334 A1 | 7/1992 | |

* cited by examiner

EXHAUST APPARATUS FOR DIESEL ENGINE

BACKGROUND OF THE INVENTION (1) Field of the Invention

The present invention relates to an exhaust apparatus for a diesel engine.

(2) Description of Related Art

In a conventional exhaust apparatus for a diesel engine, a heater that promotes burning of an unburned deposit clogging a DOC is provided to the further upstream of the DOC in an exhaust passage.

<<Problems>>

Unfortunately, an unburned deposit clogging a DOC is difficult to be burned by the heat of the heater.

In the conventional exhaust apparatus for the diesel engine, sufficient heat cannot be transferred from the heater to the unburned deposit clogging the DOC and, moreover, a slight amount of heat transferred to the unburned deposit is taken away by exhaust gas, since the heater is powered while an engine is running. Thus, the unburned deposit clogging the DOC can hardly be burned with the heat of the heater.

SUMMARY OF THE INVENTION

An object of the present invention is to provide an exhaust apparatus for a diesel engine that rapidly burns an unburned deposit in an exhaust catalyst with the heat of a heater.

An exhaust apparatus for a diesel engine, the apparatus comprising: a downstream exhaust cleaner; an upstream exhaust catalyst provided in an upstream of the downstream exhaust cleaner in an exhaust passage; a heater; an engine starter apparatus; a control unit configured to control power supply to the heater and an engine start process performed by the engine starter apparatus; and a start command unit connected to the control unit, wherein the heater is disposed at an exhaust inlet of the upstream exhaust catalyst, and when an engine has been stopped and then the start command unit gives the control unit a start command, the control unit performs powering of the heater, without performing an engine start process so as to keep the engine stopped for a predetermined period of time after the start command has been given, and subsequently performs the engine start process.

The present invention provides the following effect.

<<Effect>> An unburned deposit in an exhaust catalyst is rapidly ignited with the heat of a heater.

In the invention, the heat of the heater is sufficiently transferred to the unburned deposit in the upstream exhaust catalyst. Moreover, since the heater is powered while an engine is not running, the heat transferred to the unburned deposit is not taken away by exhaust gas. Thus, the unburned deposit is rapidly burned with the heat of the heater.

Thanks to this, the clogging and contamination in the exhaust catalyst is rapidly eliminated.

DETAILED DESCRIPTION OF PREFERRED EMBODIMENTS

Figure 1:
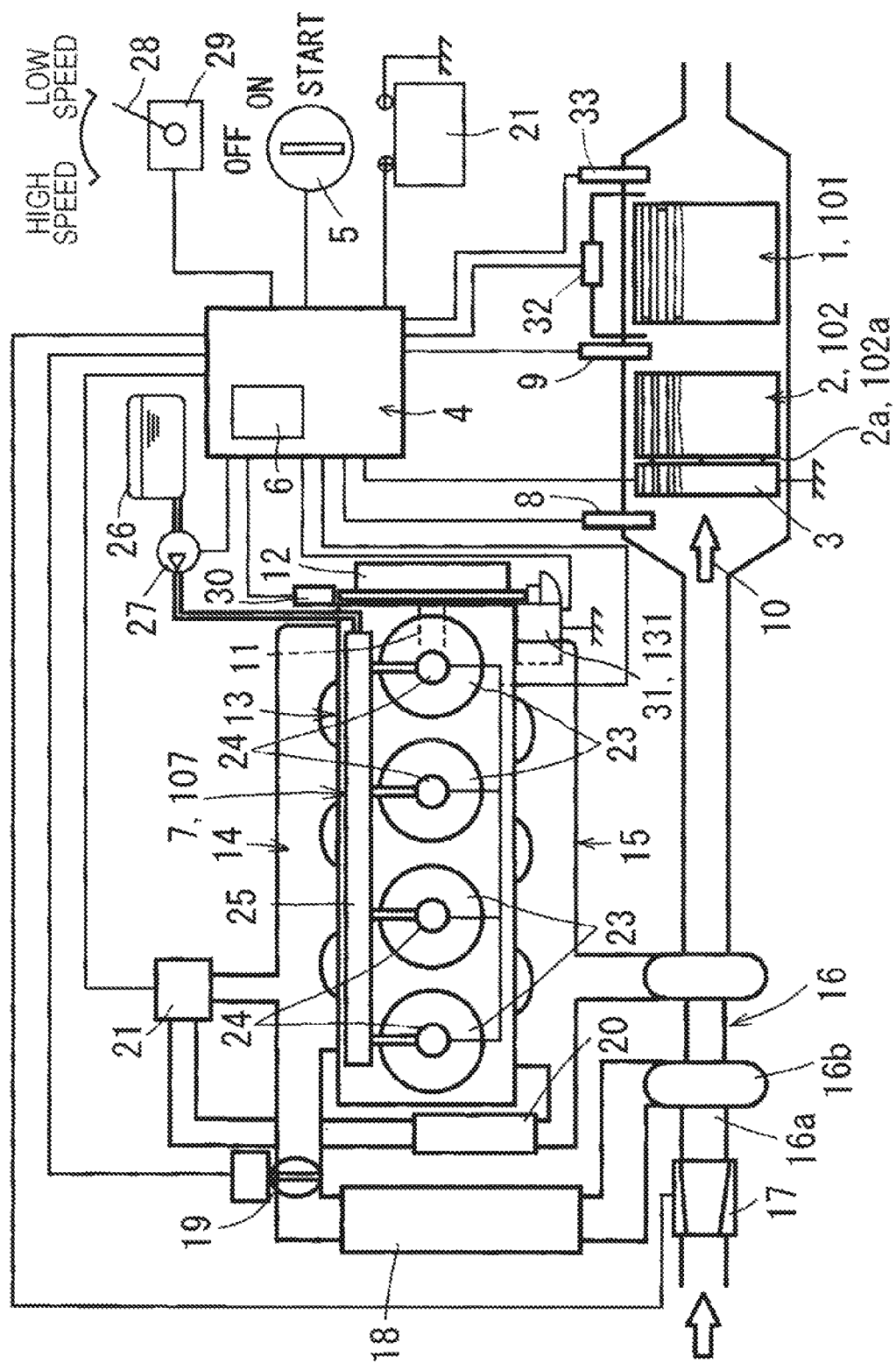
FIG. 1 is a schematic diagram of an engine including an exhaust apparatus according to an embodiment of the present invention.
Figure 2:
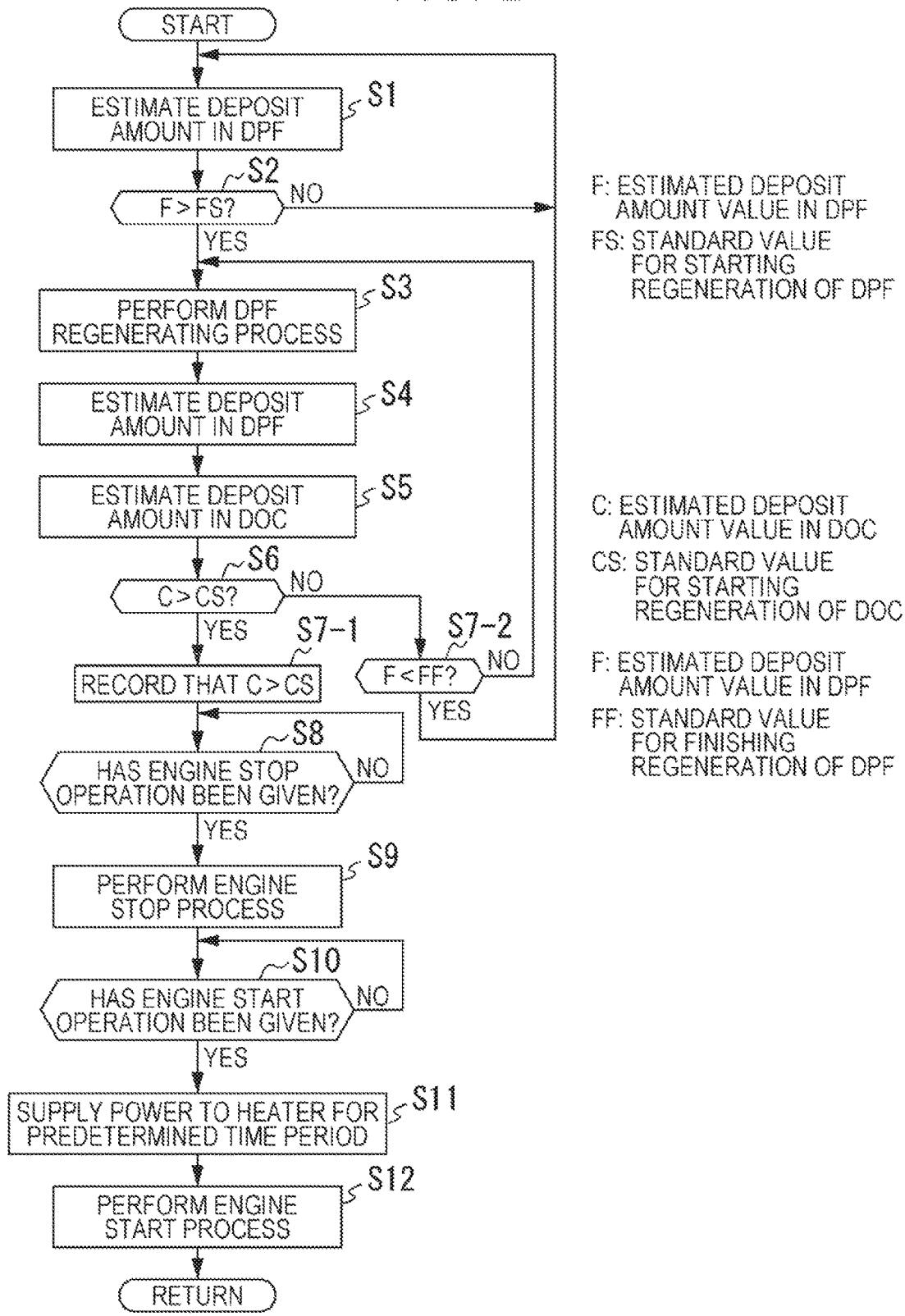
FIG. 2 is a flow chart of the process of regenerating a DPF and a DOC, which process being controlled by a control unit of the engine illustrated in FIG. 1.

FIGS. 1 and 2 illustrate an engine including an exhaust, apparatus according to an embodiment of the present invention. The embodiment described below is an in-line, four-cylinder vertical diesel engine.

The engine is configured as described below.

The extending direction of a crank shaft (11) is considered as a front-and-rear direction, the side in which a fly wheel (12) is provided is considered as a rear side, the opposite side of the rear side is considered as a front side, and the direction perpendicular to the front-and-rear direction, which is the width direction of the engine, is considered as a lateral direction.

As illustrated in FIG. 1, the engine includes an intake manifold (14) assembled to a side of cylinder heads (13), an exhaust manifold (15) assembled to the other side of the cylinder heads (13), and the fly wheel (12) provided in the rear of the engine.

As illustrated in FIG. 1, the engine is equipped with an intake-exhaust apparatus including a turbo charger (16) provided in the exhaust manifold (15), an air flow sensor (17) provided near an intake port (16a) of the turbo charger (16), an intercooler (18) provided between a compressor (16b) of the turbo charger (16) and an intake manifold (14), an intake throttle valve (19) provided between the intercooler (18) and the intake manifold (14), an EGR cooler (20) provided between the exhaust manifold (15) and the intake manifold (14), and an EGR valve (21) provided between the EGR cooler (20) and the intake manifold (14). EGR is an abbreviation of exhaust gas recirculation.

The intake throttle valve (19) and the EGR valve (21), both of which are electrically operated valves, are electrically connected to a battery (22) via a control unit (4).

The control unit (4) is an engine ECU. ECU is an abbreviation of electronic control unit, namely, a microcontroller.

As illustrated in FIG. 1, the engine is equipped with a fuel injector including fuel injection valves (24) each provided in a combustion chamber (23), a common rail (25) storing pressurized fuel that is injected from the fuel injection valves (24), and a fuel supply pump (27) that pumps fuel from a fuel tank (26) to the common rail (25).

The fuel injection valve (24) includes an electromagnetic valve, and the fuel supply pump (27) includes an electrically driven regulating valve. The electromagnetic valve and the electrically driven regulating valve are electrically connected to the battery (22) via a fuel injection control section of the control unit (4).

As illustrated in FIG. 1, the engine is equipped with a speed governing apparatus including an accelerator sensor (29) that detects a position of an accelerator lever (28) for setting a target speed of the engine, and an actual speed sensor (30) that detects an actual speed of the engine. The sensors (29) and (30) are electrically connected to the control unit (4).

As illustrated in FIG. 1, the engine is equipped with a starter device including a starter motor (31) and a key switch (5). The starter motor (31) and the key switch (5) are electrically connected to the battery (22) via the control unit (4). The key switch (5) can be set to an OFF-position an ON-position, and a START-position.

The control unit (4) sets the amount and the timing of fuel injection perfumed by the fuel injection valves (24) to reduce the difference between the target engine speed and the actual engine speed, thereby reducing the fluctuation in engine speed caused by load fluctuation. The control unit (4) adjusts the EGR valve (21) according to the engine speed, the load, and the amount of air taken in to adjust the EGR ratio. By setting the key switch (5) to the START-position, the control unit (4) drives the starter motor (31) to start the engine. By setting the key switch (5) to the ON-position, the battery (22) supplies power to each part of the engine to keep the engine running. By setting the key switch (5) to the OFF-position, the fuel injection by the fuel injection valves (24) stops and, thereby, the engine comes to a stop.

As illustrated in FIG. 1, the engine is equipped with an exhaust apparatus.

The exhaust apparatus comprises a downstream exhaust cleaner (101), an upstream exhaust catalyst (102) provided in an upstream of the downstream exhaust cleaner (101) in an exhaust passage, a heater (3), an engine starter apparatus (131), a control unit (4) configured to control power supply to the heater (3) and an engine start process performed by the engine starter apparatus, and a start command unit (105) connected to the control unit (4).

The heater (3) is disposed at an exhaust inlet (101a) of the upstream exhaust catalyst (102).

In the exhaust apparatus, when the engine has been stopped and then the start command unit (105) gives the control unit (4) a start command, the control unit (4) performs powering (S11) of the heater (3), without performing the engine stall process (S12) so as to keep the engine stopped for a predetermined period of time after the start command has been given, and subsequently performs the engine start process (S12).

In the exhaust apparatus, the heat of the heater (3) is sufficiently transferred to the unburned deposit in the upstream exhaust catalyst (102). Moreover, since the heater (3) is powered while the engine is not running, the heat transferred to the unburned deposit is not taken away by exhaust gas (10). Thus, the unburned deposit is rapidly burned with the heat of the heater (3).

Thanks to this, the clogging and contamination in the upstream exhaust catalyst (102), such as a DOC, is rapidly eliminated.

The exhaust apparatus includes as estimation unit (6) that estimates the amount of unburned deposit in the upstream exhaust catalyst (102). The heater (3) is powered only when an estimated deposit amount value in the upstream exhaust catalyst (102) estimated by the estimation unit (6) exceeds a predetermined standard value.

Thanks to this, power consumption of the heater (3) can be kept at a low level.

The exhaust apparatus includes a fuel injector (107) that performs fuel injection in the upstream of the upstream exhaust catalyst (102) in the exhaust passage, an inlet exhaust gas temperature sensor (8) that detects the exhaust gas temperature at the inlet of the upstream exhaust catalyst (102), and an outlet exhaust gas temperature sensor (9) that detects the exhaust gas temperature at the outlet of the upstream exhaust catalyst (102).

The estimation unit (6) estimates the amount of unbolted deposit in the upstream exhaust catalyst (102) based on the difference between the exhaust gas temperature at the inlet and the exhaust gas temperature at the outlet of the upstream exhaust catalyst (102), the difference occurring by fuel injection by the fuel injector (107).

The estimation unit (6) can accurately estimate the amount of unburned deposit in the upstream exhaust catatyst (102) based on the temperature difference between the inlet and the outlet of the upstream exhaust catalyst (102) which quickly changes with the degree of accumulation of the unburned deposit in the upstream exhaust catalyst (102).

In the exhaust apparatus, the fuel injector (107) is a common-rail fuel injector (7), and the fuel injection is post injection in a combustion chamber (23) performed after main injection.

In the exhaust apparatus, the fuel injector (107) may be of a type that injects fuel in the exhaust tube, and the fuel injection may be performed in the exhaust tube in the upstream of the upstream exhaust catalyst (102) in the exhaust passage.

In the exhaust apparatus, the start command unit (105) is a signal transmitter, and the start command is an electric signal transmitted from the signal transmitter to the control unit (4).

Thanks to this, the shirt command can immediately be given.

In the exhaust apparatus, the start command unit (105) is a key switch (5) of a manipulating type that transmits a command signal by a user manipulating the key switch (5).

Other than the key switch, the start command unit (105) at a manipulating type may be of a button type, a lever type, a pedal type, or a touch-panel.

In the exhaust apparatus, the start command unit (105) may be of a non-manipulating type, which transmits a command signal not based on manipulation by a user. The start command unit (105) may be of a load input estimation type which transmits a command signal based on an estimated input of the engine load or a timer type which transmits a command signal at a predetermined interval.

One of the load input estimation type detects connection between an engine and a clutch to estimate an input of the engine load.

In the exhaust apparatus, the upstream exhaust catalyst (102) is a DOC (2), and the downstream exhaust cleaner (101) is a DPF (1).

The unburned deposit is the PM sticking in the upstream exhaust catalyst (102).

Significant recovery in the performance of the upstream exhaust catalyst (102) can be obtained, since a DOC, which is susceptible to performance degradation by unburned deposit, is used as the upstream exhaust catalyst (102).

DPF is an abbreviation of diesel particulate filter that collects PM contained in the exhaust gas (10). PM is an abbreviation of particulate matter.

The DPF (1) is of a wall-flow honey-comb type which includes a large number of cells extending parallel along the longitudinal direction. The inlet or the outlet of each cell is plugged. The cells are arranged such that a cell having a plunged inlet is adjacent to a cell having a plugged outlet.

As illustrated in FIG. 2, when the estimated deposit amount value (F) of PM deposited in the DPF (1) exceeds a predetermined standard value (FS) for starting regeneration of DPF, the control unit (4) performs a DPF regenerating process controlled by the control unit (4).

The exhaust apparatus includes a pressure difference sensor (32), which is electrically connected to the control unit (4), to detect the pressure difference between the inlet and the outlet of the DPF (1). Based on the pressure difference between the inlet and outlet of the DPF (1), the control unit (4) estimates the amount of PM deposited in the DPF (1).

In the DPF regenerating process, the fuel injection valve (24) performs a post-injection to mix unburned post-injection fuel into the exhaust gas (10), and this fuel is burned by catalytic combustion in the DOC (2), thereby raising the temperature of the exhaust gas (10) to burn the PM deposited in the DPF (1) with the heat of the exhaust gas (10).

The post-injection is performed by the fuel injection valve (24) to inject fuel into the combustion chamber (23) after the main-injection during the expansion stroke or the exhaust stroke of the combustion cycle.

The post-injection starts when the temperature of the exhaust gas (10) flowing in through an exhaust inlet (2a) of the DOC (2) exceeds the activation temperature of the DOC (2). While the temperature of the exhaust gas (10) is below the activation temperature, opening of the intake throttle valve (19) is reduced under the control of the control unit (4) to raise the temperature of the exhaust gas (10).

In the DPF regenerating process, instead of the post-injection, an exhaust tube injection may be performed in which fuel is injected into the exhaust gas from a fuel injection valve provided on the exhaust tube.

As illustrated in FIG. 2, when the estimated deposit amount value (F) of PM deposited in the DPF (1) is below a standard value (FF) for finishing regeneration of DPF, the DPF regenerating process ends under the control of the control unit (4).

The DPF regenerating process may be stopped when the time period over which the exhaust gas temperature at the inlet of the DPF (1) is kept at a predetermined regeneration temperature exceeds a predetermined standard value for finishing the regeneration following the start of the DPF regenerating process. The exhaust gas temperature at the inlet of the DPF (1) is detected by an outlet exhaust gas temperature sensor (9) of the DOC (2).

The exhaust apparatus includes an outlet exhaust gas temperature sensor (33) for the DPF (1). If the exhaust gas temperature at the outlet of the DPF (1) exceeds a predetermined standard value of an abnormal combustion temperature, the control unit (4) immediately stops the DPF regenerating process.

DOC is an abbreviation of diesel engine oxidation catalyst.

The DOC (2) is of a flow-through honey-comb type including a large number of cells each having opened ends and extending parallel along the longitudinal direction. Each of the cells of the DOC (2) carries therein an oxidation catalyst.

The unburned deposit clogging the DOC (2) is likely to deposit in the DOC (2) under a low engine load, in which the exhaust gas temperature is low, and clogs particularly at the inlet (2a) of the DOC (2).

As illustrated in FIG. 1, the exhaust apparatus includes the key switch (5) as a component, and the heater (3) is provided at the exhaust inlet (2a) of the DOC (2). As illustrated in FIGS. 1 and 2, when the engine has been stopped and then an engine start operation/command is given by manipulating the key switch (5), the control unit (4) performs powering (S11) of the heater (3), without starting the engine start process (S12) so as to keep the engine stopped for a predetermined period of time after giving the engine start operation/command, and subsequently performs the engine start process (S12).

Being provided at the exhaust gas inlet (2a) of the DOC (2), the heater (3) transfers sufficient heat to the unburned deposit clogging the DOC (2), and the heat of the unburned deposit is not taken away by exhaust gas since the heater (3) is powered while the engine is not running. The unburned deposit clogging the DOC (2) can thus be burned rapidly with the heat of the heater (3).

In this manner, the clogging in the DOC (2) is rapidly eliminated.

The heater (3) is a flow-through honey-comb type heater. The heater (3) is electrically connected to the battery (22) via the control unit (4).

The heater (3) is mounted on the exhaust inlet (2a) of the DOC (2) via an insulator.

The heater (3) may be a heating wire.

As illustrated in FIG. 1, the exhaust apparatus includes an estimation unit (6) that estimates the amount of unburned deposit clogging the DOC (2).

As illustrated in FIGS. 1 and 2, the exhaust apparatus is configured to power the heater (3) only when an estimated deposit amount value (C) in the DOC (2) estimated by the estimation unit (6) exceeds a predetermined standard value (CS) for starting regeneration of the DOC (2).

If the heater (3) is powered even when a slight amount of deposit is accumulated the DOC (2), the frequency of powering the heater (3) increases, which might result in an excessive power consumption. As illustrated in FIGS. 1 and 2, however, the exhaust apparatus powers the heater (3) only when an estimated deposit amount value (C) in the DOC (2) estimated by the estimation unit (6) exceeds a predetermined standard value (CS), thereby keeping the power consumption at a low level.

As illustrated in FIG. 1, the exhaust apparatus includes the common-rail fuel injector (7) as a component, and is equipped with an inlet exhaust gas temperature sensor (8) that detects the exhaust gas temperature at the inlet of the DOC (2), and the outlet exhaust gas temperature sensor (9) that detects the exhaust gas temperature at the outlet of the DOC (2).

The estimation unit (6) estimates the amount of the unburned deposit clogging the DOC (2) based on the temperature difference between the inlet exhaust gas temperature and the outlet exhaust gas temperature of the DOC (2) occurring in a process of regenerating the DPF (1) in which a post-injection is performed by the common-rail fuel injector (7).

The estimation unit (6) includes a processing unit of the control unit (4).

The estimation unit (6) accurately estimates the amount of the unburned deposit clogging the DOC (2) based on the temperature difference between the inlet and the outlet of the DOC (2) which quickly changes with the degree of clogging in the DOC (2).

The flow of the process of regenerating the DPF (1) and the DOC (2) by the control unit (4) is illustrated in FIG. 2.

In step 1 (S1), the amount of PM deposited in the DPF (2) is estimated, and the step proceeds to step 2 (S2).

In the step 2 (S2), whether the estimated deposit amount value (F) in the DPF (1) exceeds the standard value (FS) for starting regeneration of DPF is determined. While a result of the determination is negative, the step 1 (S1) and the step 2 (S2) are repeated. When a positive result is obtained, the step proceeds to step 3 (S3).

In the step 3 (S3), the process of regenerating the DPI (2) is performed. In this regenerating process, a post-injection is performed after the temperature of the exhaust gas (10) flowing into the DOC (2) reaches the activation temperature of the exhaust gas (10). After finishing the step 3 (S3), the step proceeds to step 4 (S4).

In the step 4 (S4), the deposit amount of PM in the DPF (2) is estimated, and the step proceeds to step 5 (S5).

In the step 5 (S5), the amount of unburned deposit in the DOC (2) is estimated, and the step proceeds to step 6 (S6).

In the step 6 (S6), whether the estimated deposit amount value (C) in the DOC (2) exceeds the standard value (CS) for starting regeneration of the DOC (2) is determined. If a result of the determination is positive, the step proceeds to step 7-1 (S7-1). If the result is negative, the step proceeds to step 7-2 (S7-2).

In the step 7-1 (S7-1), the record of the positive result in the step 6 (S6) is stored in a non-volatile memory of the control null (4), and the step proceeds to step (S8).

In the step 7-2 (S7-2), whether the estimated deposit amount value (F) in the DPF (1) is below the standard value (FF) for finishing regeneration of the DPF (1) is determined. If a result of the determination is positive, the step returns to the step 1 (S1) and finishes the DPF regenerating process. If the result is negative, the step returns to the step 3 (S3) to continue the DPF regenerating process.

In the step 8 (S8), whether an engine stop operation/command has been given is determined. While a result of the determination is negative, the step 8 (S8) is repeated. When a positive result is obtained, the step proceeds to step 9 (S9).

In the step 9 (S9), an engine stop process is performed.

If the engine has been stopped and the key switch (5) is set to the ON-position, the step proceeds to step 10 (S10).

In the step 10 (S10), whether an engine start operation/command has been given is determined. While a result of the determination is negative, the step 10 (S10) is repeated. When a positive result is obtained, the step proceeds to step 11 (S11) based on the record stored in the step 7-1 (S7-1).

In the step 11 (S11) the heater (3) is powered for a predetermined period of time, and the step proceeds to step 12 (S12). The powering time period in the step 11 (S11) is previously set by a timer in the control unit (4).

In the step 12 (S12), an engine start process is performed, and the step returns to the step 1 (S1).

The present invention is not limited to the above-described embodiment including the DOC (2) as the upstream exhaust catalyst (102) and the DPF (1) as the downstream exhaust cleaner (101).

The present invention is applicable to an exhaust apparatus including an upstream DOC as the upstream exhaust catalyst (102) and a downstream DOC as the downstream exhaust cleaner (101), an exhaust apparatus including a DOC as the upstream exhaust catalyst (102) and an SCR catalyst as the downstream exhaust cleaner (101), or an exhaust apparatus including an SCR, catalyst as the upstream exhaust catalyst (102) and a DOC as the downstream exhaust cleaner (101).

A DOC having the same structure as the DOC (2) of the embodiment described above can be used as the upstream DOC as well as the downstream DOC.

The SCR catalyst is an abbreviation of selective catalytic reduction catalyst. The SCR catalyst is of a flow-through honey-comb type which includes a large number of cells extending parallel along the longitudinal direction. A urea aqueous solution injector provided in the upstream of the SCR catalyst in the exhaust passage injects urea aqueous solution in the exhaust gas to produce ammonia gas under high temperature. Nitrogen oxide (NOx) is reduced by the ammonia, producing nitrogen gas ($N_2$) and steam ($H_2O$).

In a case where the upstream exhaust catalyst (102) is an SCR catalyst and the downstream exhaust cleaner (101) is a DOC, the DOC is used for removing ammonia.

What is claimed is:
1. An exhaust apparatus for a diesel engine, the apparatus comprising:
an exhaust passage including an exhaust cleaner and an exhaust catalyst provided upstream of the exhaust cleaner, the exhaust catalyst being placed apart from the exhaust cleaner and being of a flow-through honey-comb type including a large number of cells each having opened ends and extending parallel along the longitudinal direction;
a heater;
an engine starter apparatus;
a control unit configured to control a power supply to the heater and an engine start process performed by the engine starter apparatus; and
a start command unit connected to the control unit, wherein
the heater is disposed adjacent to an exhaust inlet of the exhaust catalyst, and
when the engine has been stopped and then the start command unit gives the control unit a start command, the control unit provides power to the heater, without performing an engine start process so as to keep the engine stopped for a predetermined period of time after the start command has been given, and subsequently performs the engine start process,
an estimation unit that estimates an amount of unburned deposit in the exhaust catalyst, the heater being powered only when an estimated unburned deposit amount in the exhaust catalyst estimated by the estimation unit exceeds a predetermined standard value,
the unburned deposit in the exhaust catalyst is configured to be ignited and burned with heat generated by energization of the heater,
the apparatus further comprising:
a fuel injector that performs fuel injection upstream of the exhaust catalyst in the exhaust passage;
an inlet exhaust gas temperature sensor that detects an exhaust gas temperature at an inlet of the exhaust catalyst; and
an outlet exhaust gas temperature sensor that detects an exhaust gas temperature at an outlet of the exhaust catalyst, wherein
the estimation unit estimates the amount of unburned deposit in the exhaust catalyst based on a difference between the exhaust gas temperature at the inlet and the exhaust as temperature at the outlet of the exhaust catalyst, the difference occurring by fuel injection by the fuel injector.
2. The exhaust apparatus for a diesel engine according to claim 1, wherein
the fuel injector is a common-rail fuel injector, and
the fuel injection is post injection in a combustion chamber performed after a main injection.
3. The exhaust apparatus for a diesel engine according to claim 1, wherein
the fuel injector is of a type that injects fuel in an exhaust tube, and
the fuel injection is performed in the exhaust tube upstream of the exhaust catalyst in the exhaust passage.
4. The exhaust apparatus for a diesel engine according to claim 1, wherein
the start command unit comprises a signal transmitter, and
the start command comprises an electric signal transmitted from the signal transmitter to the control unit.
5. The exhaust apparatus for a diesel engine according to claim 4, wherein the start command unit is of a manipulating type that transmits a command signal by a user manipulating the start command unit.
6. The exhaust apparatus for a diesel engine according to claim 5, wherein the start command unit of a manipulating type comprises a key switch.
7. The exhaust apparatus for a diesel engine according to claim 4, wherein the start command unit is of a non-manipulating type which transmits a command signal not based on manipulation by a user.

8. The exhaust apparatus for a diesel engine according to claim 1, wherein
the exhaust catalyst is a diesel oxidation catalyst (DOC), and
the exhaust cleaner is a diesel particulate filter (DPF).

9. The exhaust apparatus for a diesel engine according to claim 1, wherein
the exhaust catalyst is a DOC, and
the exhaust cleaner is a DOC.

10. An exhaust apparatus for a diesel engine, the apparatus comprising:
an exhaust passage including an exhaust cleaner and an exhaust catalyst provided upstream of the exhaust cleaner;
a heater;
an engine starter apparatus;
a control unit configured to control a power supply to the heater and an engine start process performed by the engine starter apparatus; and
a start command unit connected to the control unit, wherein
the heater is disposed adjacent to an exhaust inlet of the exhaust catalyst, and
when the engine has been stopped and then the start command unit gives the control unit a start command, the control unit provides power to the heater, without performing an engine star process so as to keep the engine stopped for a predetermined period of time after the start command has been given, and subsequently performs the engine start process,
an estimation unit that estimates an amount of unburned deposit in the exhaust catalyst, the heater being powered only when an estimated unburned deposit amount in the exhaust catalyst estimated by the estimation unit exceeds a predetermined standard value,
the unburned deposit in the exhaust catalyst is configured to be ignited and burned with heat generated by energization of the heater,
the exhaust catalyst is a DOC, and
the exhaust cleaner is a selective catalytic reduction (SCR) catalyst.

11. The exhaust apparatus for a diesel engine according to claim 1 wherein
the exhaust catalyst is an SCR catalyst, and
the exhaust cleaner is a DOC.

12. An exhaust apparatus for a diesel engine, the apparatus comprising:
an exhaust passage including an exhaust cleaner and an exhaust catalyst provided upstream of the exhaust cleaner;
a heater;
an engine starter apparatus;
a control unit configured to control a power supply to the heater and an engine start process performed by the engine starter apparatus; and
a start command unit connected to the control unit, wherein
the heater is disposed adjacent to an exhaust inlet of the exhaust catalyst, and
when the engine has been stopped and then the start command unit gives the control unit a start command, the control unit provides power to the heater, without performing an engine start process so as to keep the engine stopped for a predetermined period of time after the start command has been given, and subsequently performs the nine start process,
an estimation unit that estimates an amount of unburned deposit in the exhaust catalyst, the heater being powered only when an estimated unburned deposit amount in the exhaust catalyst estimated by the estimation unit exceeds a predetermined standard value,
the unburned deposit in the exhaust catalyst is configured to be ignited and burned with heat generated by energization of the heater,
the apparatus further comprising:
a fuel injector that performs fuel injection upstream of the exhaust catalyst in the exhaust passage;
an inlet exhaust gas temperature sensor that detects an exhaust gas temperature at an inlet of the exhaust catalyst; and
an outlet exhaust gas temperature sensor that detects an exhaust se temperature at an outlet of the exhaust catalyst, wherein
the estimation unit estimates the amount of unburned deposit in the exhaust catalyst based on a difference between the exhaust gas temperature at the inlet and the exhaust gas temperature at the outlet of the exhaust catalyst, the difference occurring by fuel injection by the fuel injector,
the exhaust catalyst is a DOC, and
the exhaust cleaner is a selective catalytic reduction (SCR) catalyst.

13. An exhaust apparatus for a diesel engine, the apparatus comprising:
an exhaust passage including an exhaust cleaner and an exhaust catalyst provided upstream of the exhaust cleaner;
a heater;
an engine starter apparatus;
a control unit configured to control a power supply to the heater and an engine start process performed by the engine starter apparatus; and
a start command unit connected to the control unit, wherein
the heater is disposed adjacent to an exhaust inlet of the exhaust catalyst, and
when the engine has been stopped and then the start command unit gives the control unit a start command, the control unit provides power to the heater, without performing an engine start process so as to keep the engine stopped for a predetermined period of time after the start command has been given, and subsequently performs the engine start process,
an estimation unit that estimates an amount of unburned deposit in the exhaust catalyst, the heater being powered only when an estimated unburned deposit amount in the exhaust catalyst estimated by the estimation unit exceeds a predetermined standard value,
the unburned deposit in the exhaust catalyst is configured to be ignited and burned with heat generated by energization of the heater,
the start command unit comprises a signal transmitter,
the start command comprises an electric signal transmitted from the signal transmitter to the control unit,
the start command unit is of a non-manipulating type which transmits a command signal not based on manipulation by a user, and
the start command unit of the non-manipulating type is of a load input estimation type which transmits a command signal based on an estimated input of the engine load.

14. An exhaust apparatus for a diesel engine, the apparatus comprising:
- an exhaust passage including an exhaust cleaner and an exhaust catalyst provided upstream of the exhaust cleaner;
- a heater;
- an engine starter apparatus;
- a control unit configured to control a power supply to the heater and an engine start process performed by the engine starter apparatus; and
- a start command unit connected to the control unit, wherein
- the heater is disposed adjacent to an exhaust inlet of the exhaust catalyst, and
- when the engine has been stopped and then the start command unit gives the control unit a start command, the control unit provides power to the heater, without performing an engine start process so as to keep the engine stopped for a predetermined period of time after the start command has been given, and subsequently performs the engine start process,
- an estimation unit that estimates an amount of unburned deposit in the exhaust catalyst, the heater being powered only when an estimated unburned deposit amount in the exhaust catalyst estimated by the estimation unit exceeds a predetermined standard value,
- the unburned deposit in the exhaust catalyst is configured to be ignited and burned with heat generated by energization of the heater,
- the start command unit comprises a signal transmitter,
- the start command comprises an electric signal transmitted from the signal transmitter to the control unit,
- the start command unit is of a non-manipulating type which transmits a command signal not based on manipulation by a user, and
- the start command unit of the non-manipulating type is of a timer type which transmits a command signal at a predetermined interval.

* * * * *